(12) United States Patent
Polcyn et al.

(10) Patent No.: US 9,783,899 B2
(45) Date of Patent: Oct. 10, 2017

(54) APPARATUS AND METHOD FOR OPERATING AN ELECTROLYSIS WITH AN OXYGEN DEPOLARIZED CATHODE

(71) Applicant: ThyssenKrupp Uhde Chlorine Engineers (Italia) S.r.l., Milan (IT)

(72) Inventors: Gregor Polcyn, Dortmund (DE); Philip Hofmann, Dortmund (DE); Stephan Köberle, Witten (DE); Dirk Hoormann, Werne an der Lippe (DE); Peter Woltering, Neuenkirchen (DE); Dmitri Donst, Köln (DE); Jens Wilhelm Kuhlmann, Dortmund (DE); Peter Toros, Essen (DE); Frank Funck, Bottrop (DE); Sebastian Austenfeld, Soest (DE); Jörg Wilfried Kolbe, Bochum (DE)

(73) Assignee: Thyssenkrupp Uhde Chlorine Engineers (Italia) S.r.l., Milan (IT)

( * ) Notice: Subject to any disclaimer, the term of this patent is extended or adjusted under 35 U.S.C. 154(b) by 0 days.

(21) Appl. No.: 14/903,108

(22) PCT Filed: Jun. 27, 2014

(86) PCT No.: PCT/EP2014/063733
§ 371 (c)(1),
(2) Date: Jan. 6, 2016

(87) PCT Pub. No.: WO2015/003932
PCT Pub. Date: Jan. 15, 2015

(65) Prior Publication Data
US 2016/0160366 A1 Jun. 9, 2016

(30) Foreign Application Priority Data
Jul. 8, 2013 (DE) .................. 10 2013 011 298

(51) Int. Cl.
*C25B 1/00* (2006.01)
*C25B 15/02* (2006.01)
(Continued)

(52) U.S. Cl.
CPC ................ *C25B 15/02* (2013.01); *C25B 1/22* (2013.01); *C25B 1/34* (2013.01); *C25B 15/08* (2013.01)

(58) Field of Classification Search
CPC ........... C25B 15/02; C25B 15/08; C25B 1/26; C25B 1/34; C25B 1/22
See application file for complete search history.

(56) References Cited

U.S. PATENT DOCUMENTS

| 5,972,196 A * | 10/1999 | Murphy ................ B01D 53/22 204/157.15 |
| 2009/0211915 A1 | 8/2009 | Gestermann et al. |
| 2012/0222965 A1 | 9/2012 | Bulan et al. |

FOREIGN PATENT DOCUMENTS

| RU | 2 309 198 C1 | 10/2007 |
| WO | 03/042430 A2 | 5/2003 |

* cited by examiner

*Primary Examiner* — Arun S Phasge
(74) *Attorney, Agent, or Firm* — Dilworth & Barrese, LLP

(57) ABSTRACT

What is proposed is an apparatus for conducting an electrolysis with an oxygen depolarized cathode, comprising: (a) an electrolyzer 1 which (b) is connected on the reactant side via an inlet control valve 2 to an oxygen source 3, and (c) on the product side has at least one off gas line 4, (d) which has at least one pressure regulator (PT) 5, at least one gas analyzer (QI) 6, at least one flow regulator (FT) 7 and at least one outlet control valve 8, wherein (e) the pressure regulator 5 controls the inlet control valve 2, (f) the gas analyzer 6
(Continued)

Figure 1:
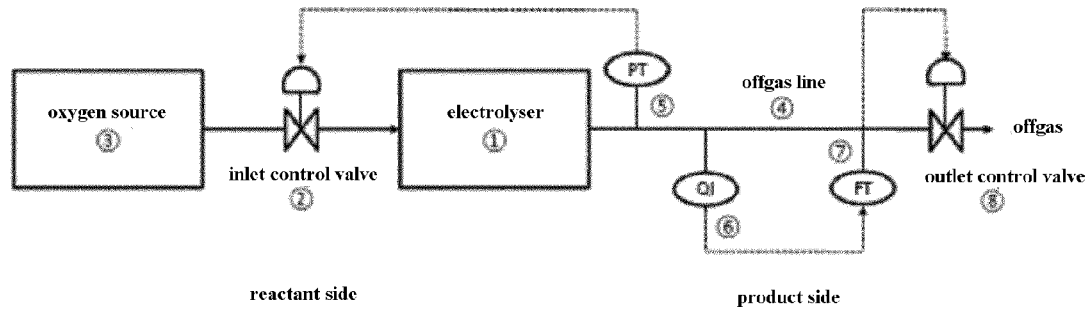

Apparatus of the invention with one off gas line controls the flow regulator 7 or the outlet control valve 8 and/or (g) the flow regulator 7 controls the outlet control valve 8.

19 Claims, 2 Drawing Sheets

(51) Int. Cl.
*C25B 1/34* (2006.01)
*C25B 1/22* (2006.01)
*C25B 15/08* (2006.01)

Apparatus of the invention with one off gas line

Apparatus for electrolysis with ODC according to the prior art

Processing of the oxygen stream in HCl electrolysis

APPARATUS AND METHOD FOR OPERATING AN ELECTROLYSIS WITH AN OXYGEN DEPOLARIZED CATHODE

FIELD OF THE INVENTION

The invention relates to the field of electrolysis technology and relates to an improved method for operating an electrolysis cell with an oxygen depolarized cathode.

PRIOR ART

In chlor-alkali electrolysis and in the electrolysis of hydrogen chloride, the use of so called oxygen depolarized cathodes (ODCs) has been found to be useful. In this technology, no hydrogen evolves at the cathode. Instead, oxygen is added by means of a gas diffusion electrode (cathode). The oxygen is reduced at the cathode, and the reaction with water forms hydroxide ions.

This electrode, described, for example, in European patent application EP 02398101 A1, BAYER), is an open-pore membrane arranged between electrolyte and a gas space, and having an electrically conductive layer comprising catalyst. This arrangement achieves oxygen reduction at the triphasic boundary between electrolyte, catalyst and oxygen, very close to the electrolyte.

This reaction greatly lowers the potential of the electrode, which leads to an energy saving of about 30% compared to a hydrogen-evolving electrode. A significant demand in ODC technology is to provide very pure oxygen, for example cryogenic $O_2$ having a purity of more than 99.5% by volume.

Prior art plants for chlor-alkali electrolysis using OCCs are generally designed in the form of loop reactors. This involves measuring the oxygen volume flow rate which enters a sequence of electrically in series connected electrolysis cells which are charged with fluids in parallel ("electrolyser"), and setting it to the target value with the aid of a control valve. In this context, it has to be ensured that the electrolyser is supplied with sufficient oxygen,
no accumulation of inert gases (e.g. nitrogen) occurs, and
the amount of hydrogen formed as a result of side reactions remains at a minimum.

For this purpose, firstly, the oxygen is provided in a high stoichiometric excess and a portion of the unconsumed oxygen is released to the waste air together with unwanted inert gases and hydrogen. The remaining amount is compressed, mixed with fresh oxygen and returned to the electrolyser. In this way, constant oxygen, inert gas and hydrogen concentration is established at the electrolyser outlet. A method in which the reactant gas is supplied under a pressure greater than the process pressure by means of a gas jet pump and the reactant gas is decompressed to process pressure in the gas jet pump, so as to give a suction pressure lower than the process pressure, is described in patent specification EP 1499756 B1 (Bayer). Another possibility is the compression of the oxygen gas in the recycle loop.

In the electrolysis of hydrochloric acid, in one variant, the same process procedure is used for the oxygen. However, it is additionally necessary here to purify the oxygen before it is sucked in by means of the gas jet pump, and more particularly to remove the hydrogen present therein (cf. EP 1664386 B1, BAYER). For this purpose, the oxygen stream is conducted through a scrubber and HCl and chlorine are removed therein with alkaline solution. In a downstream demister, entrained alkali droplets are removed. Subsequently, the oxygen stream is heated with the aid of a heat exchanger and passed through a hydrogen removal reactor. This is followed by the cooling of the gas and the removal of condensed water. Only then can the purified oxygen be mixed with fresh oxygen and recycled back into the electrolyser. But in this mode of operation inert gases also accumulate in the circuit, and so a portion of the gas stream has to be released to the atmosphere and is thus lost.

Thus, the prior art electrolysis methods have the common disadvantage that discharge of a portion of the unconsumed oxygen is unavoidable as a result of unwanted accumulation of inert gases and hydrogen. The losses as a result of the so-called "purge stream" can be very considerable—namely up to 50% by volume without oxygen recycling—and in this way very adversely affect the economics of the method.

The complex problem addressed by the present invention was therefore that of remedying the disadvantages of the prior art outlined at the outset. More particularly, a process for conducting an electrolysis with ODCs was to be provided, which, at the same time, incurs a smaller oxygen loss or a smaller volume of purge stream,
in which a complex and hence costly purification of the oxygen, specifically in the case of HCl electrolysis, is avoided and
the excess of oxygen during the operation of the electrolyser can be reduced.

DESCRIPTION OF THE INVENTION

The invention firstly relates to an apparatus for conducting an electrolysis with an oxygen depolarized cathode, comprising
(a) an electrolyser 1 which
(b) is connected on the reactant side via an inlet control valve 2 to an oxygen source 3, and
(c) on the product side has at least one off gas line 4
(d) which has at least one pressure regulator (PT) 5, at least one gas analyser (QI) 6, at least one flow regulator (FT) 7 and at least one outlet control valve 8,
wherein
(e) the pressure regulator 5 controls the inlet control valve 2,
(f) the gas analyser 6 controls the flow regulator 7 or the outlet control valve 8 and/or
(g) the flow regulator 7 controls the outlet control valve 8.

The invention secondly relates to a complementary method for conducting an electrolysis with an oxygen depolarized cathode, in which
(i) oxygen is introduced with the aid of an oxygen source 3 via an inlet control valve 2 into an electrolyser 1,
(ii) the oxygen unconsumed in the electrolysis is discharged via at least one off gas line 4,
(iii) the pressure at the electrolyser outlet is measured with the aid of at least one pressure regulator 5,
(iv) the inlet control valve 2 is controlled via comparison of the actual and preset target values and the desired pressure is thus established at the electrolyser inlet, and
(v) the outlet control valve 8 is adjusted with the aid of the flow regulator 7 such that at least 1% by volume of the oxygen flow rate is discharged continuously, and the gas analyser ensures that a hydrogen content of below 4% by volume/S*N, preferably below 2% by volume/N with a security factor of 2, is maintained, where N is the number of electrochemical elements in the measurement sequence and S is the security factor, which is a number greater than 1 and preferably 2 to 5.

The gas analyser is therefore preferably a unit capable of determining the amount of hydrogen in a system. In principle, however, other useful components are those which determine the amount of inert gases, specifically including nitrogen.

It has been found that, surprisingly, a pressure-controlled oxygen supply completely solves the complex problem outlined at the outset.

While a loss of around 20% by volume of the oxygen released to the waste air is typical in the case of volume-controlled oxygen supply, this can be reduced down to 1% by volume in the case of use of the apparatus of the invention or in the case of performance of the process according to the invention. The oxygen excess can be limited to about 1% to about 10% by volume and especially about 5% to about 8% by volume, such that there is now likewise no longer any need for a reactor loop, as is likewise obligatory in the prior art.

The apparatus of the invention additionally makes it possible to dispense with the technically complex purification of the oxygen stream, which has been an obligatory requirement to date according to the prior art, through the sequence of steps of washing, demisting, heating, hydrogen removal and cooling. The result of this is not just that the process in operation, especially in the case of HCl electrolysis, can be conducted much less expensively, but also that the high capital costs for the construction of corresponding purification systems can be saved.

Assuming a fresh oxygen concentration of 99.5% by volume, a current density of 4 kA/m$^2$ and a stoichiometric excess of oxygen of 5% by volume, the oxygen content at the electrolyser outlet is still at a concentration of 90% by volume, while the amount of hydrogen is 186 ppm v/v in the off gas stream, with an electrolyser composed of 144 elements and an amount of hydrogen produced by the side reaction of 3.6 l (STP)/h. This corresponds to a hydrogen concentration of 2.6% by volume and is therefore below the explosion limit if all the hydrogen is obtained in one cell. In case of an excess of 8% by volume, an oxygen concentration of 94% by volume can actually be achieved at the electrolyser outlet, with a hydrogen content of 121 ppm v/v in the overall stream or a maximum of 1.7% by volume in one element. This value is therefore below the lower explosion limit with a safety margin. This means that, because of the high oxygen concentration still available, the process does not exert any adverse effect on the cell voltage, i.e. does not reduce the economic viability.

An essential factor is the observance of the lower explosion limit of the hydrogen/oxygen mixture. The hydrogen evolution, as a side reaction, can proceed homogeneously over the entire electrolyser, or else in just one element as a result of a malfunction. This extreme case should be considered in the assessment of the hydrogen content in the waste air. The lower explosion limit of hydrogen in pure oxygen is assumed to be 4% by volume. If a gas analyser is used for 100 elements, for example, and it is assumed that only one element is producing hydrogen, the analyser will display only one hundredth of the measurement because of the dilution. If these 100 elements are divided into two so called racks and one analyser is used for each, the measurement in this case is one fiftieth in the extreme case being considered. In general, for the maximum permissible amount of hydrogen in the off gas, the explosion limit, the safety margin (S≥1) and the number of elements in the measurement sequence (N) have to be considered. This results in the relationship 4% by volume/S*N for the maximum hydrogen concentration in the off gas of a measurement sequence.

APPARATUS OF THE INVENTION

In its simplest configuration, the apparatus of the invention comprises an electrolyser 1 which is connected on the reactant side via an inlet control valve 2 to an oxygen source 3, and on the product side has at least one off gas line 4, the latter having a pressure regulator (PT) 5, a gas analyser (QI) 6, a flow regulator (FT) 7 and an outlet control valve 8. A constant and sufficient amount of oxygen is provided through pressure measurement at the electrolyser outlet by the pressure regulator 5. The latter is connected to the inlet control valve in the manner of a simple closed-loop control circuit. If the actual value deviates from the preset target value, the inlet valve 2 is opened or closed until the target value is attained again.

In order to ensure that not too many inert gases accumulate in the system and in this way reduce the oxygen concentration at the electrolyser exit, the outlet valve 8 is controlled with the aid of a flow regulator 7 in such a way that a purge stream of at least 1% by volume but at most about 10% by volume is discharged.

A further problem may be that hydrogen forms in the cells because of side reactions and collects in the off gas line, and an ignitable mixture forms over the course of time. For this purpose, the off gas line contains a gas analyser 6 which measures the H$_2$ concentration continuously and compares it with a permissible limit. The gas analyser is likewise connected via a simple control circuit to the flow regulator 7 and the outlet control valve 8. If the limit is exceeded, the message is sent to the flow regulator to open the outlet control valve further, such that not just at least 1% by volume of off gas is discharged, but as much as necessary for the value to reliably go below the limit again. Once this has been achieved, the valve is throttled again back to the minimum off gas flow rate. This embodiment is shown in FIG. 1.

In the preferred embodiment for chlor-alkali electrolysis with oxygen depolarized cathodes, the electrolyser consists of electrolysis cells which are connected in series electrically and connected in parallel for supply with fluids. These consist of an anode chamber with an anode, a cathode chamber with a cathode, a current distributor and a gas space. The cathode used here is a gas diffusion electrode (oxygen depolarized cathode). The two electrode chambers are separated from one another by a semipermeable membrane. Between semipermeable membrane and the gas diffusion electrode is a gap created by a percolator and filled with catholyte. The pressure is equalized here preferably, but not exclusively, in the manner described in the already cited patent application EP 1446515 A1. Alternatively, it is also possible to accomplish this equalization of pressure by the gas pocket principle—as described, for example, in EP 0872578 B1 (Bayer).

Method of the Invention

The method of the invention, which is preferably either a chlor-alkali electrolysis with oxygen depolarized cathodes (gas diffusion electrodes) or an HCl electrolysis with oxygen depolarized cathodes (gas diffusion electrodes), requires the apparatus of the invention for performance, and comprises the following steps:
(i) oxygen is introduced with the aid of an oxygen source 3 via an inlet control valve 2 into an electrolyser 1,
(ii) the oxygen unconsumed in the electrolysis is discharged via at least one off gas line 4, (iii) the pressure at the electrolyser outlet is measured with the aid of at least one pressure regulator 5,
(iv) the inlet control valve 2 is controlled via comparison of the actual and preset target values and the desired pressure is thus established at the electrolyser inlet, and
(v) the outlet control valve 8 is adjusted with the aid of the flow regulator 7 such that at least 1% by volume and preferably about 3% to about 8% by volume of the oxygen flow rate required in stoichiometric terms for the electrochemical reaction is discharged continuously.

The way in which the method works has already been explained above, and so a repetition is unnecessary.

However, a preferred embodiment here also involves monitoring the hydrogen content in the unconsumed oxygen by means of a gas analyser 6 which, on exceedance of a present limit, controls the outlet valve 8 with the aid of the flow regulator 7 such that such an amount of oxygen-rich off gas is discharged, that the hydrogen content in the unconsumed oxygen stream goes below the limit again.

The method of the invention can also be performed with an electrolyser consisting of electrolysis cells having at least one gas chamber.

It is likewise preferable that the hydrogen content in the unconsumed oxygen in each individual off gas line is monitored by a gas analyser 6 which, on exceedance of a present limit, controls the respective outlet valve 8 with the aid of the flow regulator 7, such that such an amount of oxygen-rich off gas is discharged, that the hydrogen content in the unconsumed oxygen stream goes below the limit again in the off gas line in question.

EXAMPLES

Inventive Example 1

Inventive Example 1 shows, in FIG. 1, an electrolyser with an ODC, in which the amount of oxygen supplied is controlled not by volume but by pressure.

The electrolyser 1 is connected on the reactant side via an inlet control valve 2 to an oxygen source 3. On the product side is the off gas line 4 which is connected at the electrolyser outlet to a pressure regulator 5 which controls the inlet valve 2 by comparison of the actual value with the preset target value. Further down the off gas line are a gas analyser 6, a flow regulator 7 and an outlet control valve 8. The flow regulator 7 is adjusted such that it releases, via the outlet control valve 8, a constant purge stream of at least 3% by volume of the oxygen required in stoichiometric terms for the electrochemical reaction into the waste air. The gas analyser 6 monitors the hydrogen content in the off gas stream and sends a message to the flow regulator as soon as a preset limit is exceeded. Then the volume of the purge stream is subjected to closed-loop control, such that the value goes below the limit.

Comparative Example C1

Figure 2:
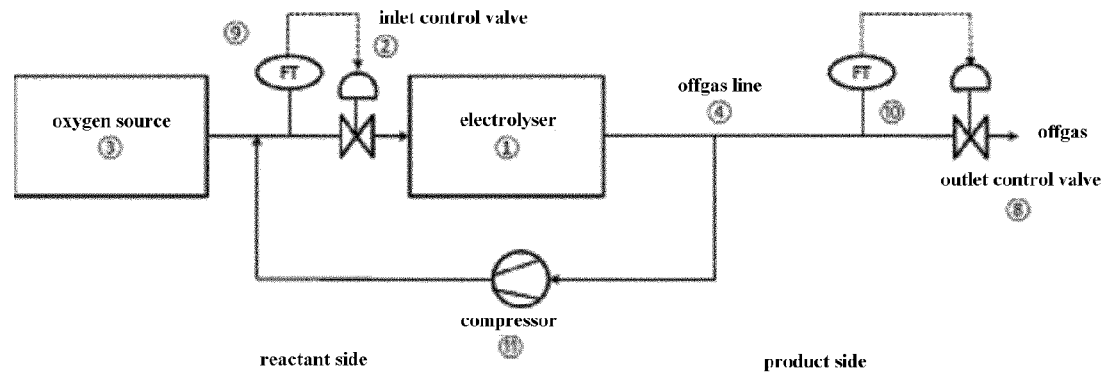

Example C1 shows a prior art plant for operation of a chlor-alkali electrolysis with an ODC, designed as a loop reactor. The method is illustrated by FIG. 2, which is elucidated hereinafter:

By means of the flow regulator 9, the volume flow rate to the electrolyser 1 is measured and set by means of the inlet control valve 2. A first portion of the stream coming from the electrolyser is released to the waste air via the outlet control valve 8. A second portion of the stream is compressed in the compressor 11, mixed with fresh oxygen and returned to the electrolyser 1. Instead of the compressor, it is also possible to use an oxygen jet.

The amount of purge stream which has to be discharged in order to establish a constant and operation-compliant oxygen, inert gas and hydrogen concentration at the electrolyser outlet is about 20% by volume.

Comparative Example C2

Figure 3:
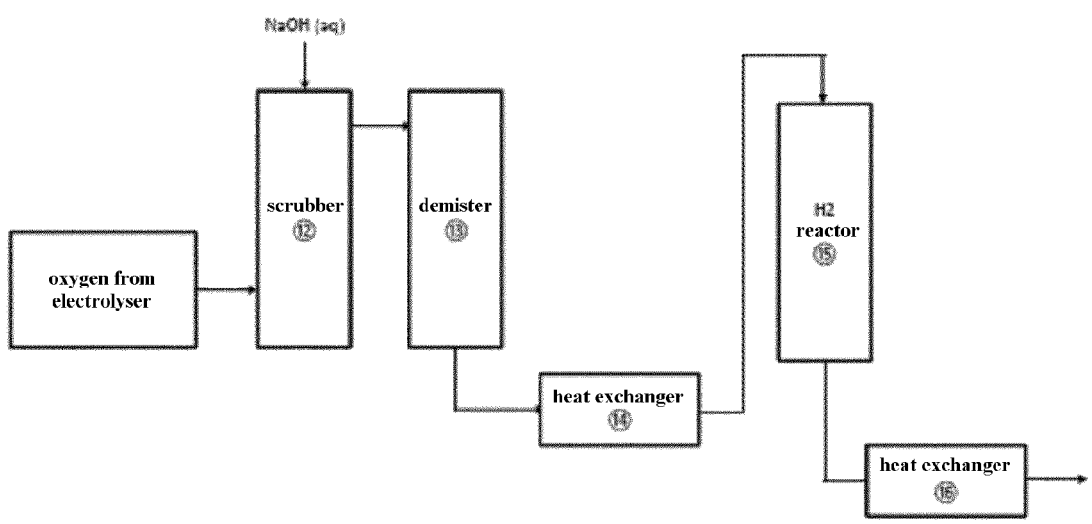

Example C2 shows, in FIG. 3, a flow diagram for the purification of the oxygen stream which is required in the case of HCl electrolysis. In this case, the gas stream, after leaving the electrolyser, is scrubbed in the scrubber 12, where HCl and chlorine are removed from the oxygen with the aid of alkali. In the downstream demister 13, entrained alkali droplets are removed. Subsequently, it goes into the heat exchanger 14, in which the oxygen stream is heated, and then passed into the hydrogen removal reactor 15. Thereafter, the gas stream is cooled in a second heat exchanger 16 and freed from condensed water, before the purified gas stream is compressed again and supplied to the electrolyser mixed with fresh oxygen.

What is claimed is:
1. Apparatus for conducting an electrolysis with an oxygen depolarized cathode, comprising
   (a) an electrolyser,
   (b) an oxygen source which is connected to the electrolyser on the reactant side thereof via an inlet control valve,
   (c) at least one off gas line on the product side of the electrolyser, and
   (d) at least one pressure regulator (PT), at least one gas analyser (QI), at least one flow regulator (FT) and at least one outlet control valve in the off gas line,
   wherein
   (e) the pressure regulator controls the inlet control valve,
   (f) the gas analyser controls the flow regulator or the outlet control valve, and/or
   (g) the flow regulator controls the outlet control valve.
2. The apparatus of claim 1, wherein the at least one pressure regulator (PT) and the inlet control valve are connected to one another in a simple closed-loop circuit.
3. The apparatus of claim 1, wherein a reactant side of the electrolyser and the off gas line only communicate through the electrolyser, without a recirculating reactor loop from the off gas line to the reactant side of the electrolyser being present.
4. The apparatus of claim 3, wherein the outlet control valve is uncoupled to any further purification apparatus in the off gas line.
5. The apparatus of claim 1, wherein the outlet control valve is uncoupled to any further purification apparatus in the off gas line.
6. A method for conducting an electrolysis with an oxygen depolarized cathode, comprising the steps of
   (i) introducing oxygen with the aid of an oxygen source via an inlet control valve into an electrolyser,
   (ii) discharging the oxygen unconsumed in the electrolysis via at least one off gas line,
   (iii) measuring the pressure at the electrolyser outlet with the aid of at least one pressure regulator,
   (iv) controlling the inlet control valve by comparing the actual and preset target values and thus establishing the desired pressure at the electrolyser inlet, and
   (v) adjusting an outlet control valve in the off gas line with the aid of a flow regulator such that at least 1% by volume of the oxygen flow rate required in stoichiometric terms for the electrochemical reaction is discharged continuously.

7. The method of claim 6, comprising monitoring the hydrogen content in the unconsumed oxygen by a gas analyser which, when a preset limit is exceeded, controls the outlet valve with the aid of the flow regulator, or directly, such that an amount of oxygenrich off gas is released and the hydrogen content in the unconsumed oxygen stream drops below the limit again.

8. The method of claim 6, wherein individual electrolysis cells in the electrolyser are connected to at least one central off gas line containing the pressure regulator, a gas analyser, the flow regulator and the outlet control valve.

9. The method of claim 6, comprising monitoring the hydrogen content in the unconsumed oxygen in the off gas line is monitored by a gas analyser which, when a preset limit is exceeded, controls the respective outlet valve with the aid of the flow regulator, or directly, such that an amount of oxygen is discharged, so that the hydrogen content in the unconsumed oxygen stream drops below the limit again in the off gas line in question.

10. The method of claim 6, comprising adjusting the outlet control valves in each individual off gas line with the aid of the flow regulator such that a sum total of at least 1% of the oxygen flow rate required in stoichiometric terms for the electrochemical reaction is discharged continuously, where the amount of oxygen for each individual off gas line may be different.

11. The method of claim 6, comprising monitoring the hydrogen content in the unconsumed oxygen in each individual off gas line by a gas analyser which, when a preset limit is exceeded, controls the respective outlet valve with the aid of the flow regulator, or directly, such that an amount of oxygen is discharged, so that the hydrogen content in the unconsumed oxygen stream drops below the limit again in the off gas line in question.

12. The method of claim 6, wherein the amount of off gas which is released into the environment is about 1% to about 10% by volume of the oxygen required in stoichiometric terms for the electrochemical reaction.

13. The method of claim 12, wherein the amount of off gas which is released into the environment is about 5% to about 8% by volume of the oxygen required in stoichiometric terms for the electrochemical reaction.

14. The method of claim 6, wherein the stoichiometric excess of oxygen with which the electrolyser is fed is about 1 to about 10% by volume.

15. The method of claim 6, involving a chlor-alkali electrolysis or an HCl electrolysis.

16. The method of claim 6, comprising connecting the at least pressure regulator and the inlet control valve to one another in a simple closed-loop circuit.

17. The method of claim 6, comprising coupling an inlet end of the off gas line to only the electrolyser and omitting a recirculating reactor loop from the off gas line to a reactant side of the electrolyser.

18. The method of claim 17, comprising directly releasing off gas into the environment through the outlet control valve without further purification.

19. The method of claim 6, comprising directly releasing off gas into the environment through the outlet control valve without further purification.

* * * * *